US012633014B2

(12) United States Patent  
He et al.

(10) Patent No.: US 12,633,014 B2  
(45) Date of Patent: May 19, 2026

(54) GENERATING IMAGE METHOD AND APPARATUS, DEVICE, AND MEDIUM

(71) Applicant: Beijing Zitiao Network Technology Co., Ltd., Beijing (CN)

(72) Inventors: Qian He, Beijing (CN); Lijie Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 193 days.

(21) Appl. No.: 18/566,523

(22) PCT Filed: May 26, 2022

(86) PCT No.: PCT/CN2022/095211  
§ 371 (c)(1),  
(2) Date: Dec. 1, 2023

(87) PCT Pub. No.: WO2022/253094  
PCT Pub. Date: Dec. 8, 2022

(65) Prior Publication Data  
US 2024/0257426 A1     Aug. 1, 2024

(30) Foreign Application Priority Data  
Jun. 1, 2021     (CN) .......................... 202110608977.1

(51) Int. Cl.  
*G06T 11/60*          (2026.01)  
*G06V 10/54*          (2022.01)  
(Continued)

(52) U.S. Cl.  
CPC .............. *G06T 11/60* (2013.01); *G06V 10/54* (2022.01); *G06V 10/56* (2022.01); *G06V 10/60* (2022.01)

(58) Field of Classification Search  
CPC ........ G06T 11/60; G06V 10/56; G06V 10/54; G06V 10/60  
(Continued)

(56) References Cited

U.S. PATENT DOCUMENTS 10,318,889 B2 * 6/2019 Xu .......................... G06V 20/49  
10,579,869 B1    3/2020 Xiong et al.  
(Continued)

FOREIGN PATENT DOCUMENTS

CN        107689073 A      2/2018  
CN        110211192 A      9/2019  
(Continued)

OTHER PUBLICATIONS

Notice of Grant of Invention Patent Right for Chinese Patent Application No. 202110608977.1 dated Oct. 12, 2024, 4 pages.  
(Continued)

*Primary Examiner* — Thomas J Lett  
(74) *Attorney, Agent, or Firm* — Astute IP Law Group

(57) ABSTRACT

The embodiments of the present disclosure relate to an image generation method, apparatus, device, and medium. The method includes: obtaining an initial image of a target object, where the initial image is an image in a first image style; inputting the initial image into a first machine learning model; and obtaining a target image of the target object based on an output result of the first machine learning model, where the target image is an image in a second image style. The first machine learning model is obtained based on a second machine learning model obtained based on training first sample images of the target object and second sample images of the target object. The first sample image and the second sample image are respectively images obtained by  
(Continued)

rendering simulation models of the target object in different states based on rendering parameters in the first and second image styles.

20 Claims, 2 Drawing Sheets

(51) Int. Cl.
    *G06V 10/56*          (2022.01)
    *G06V 10/60*          (2022.01)

(58) Field of Classification Search
    USPC ......................................................... 345/619
    See application file for complete search history.

(56)                References Cited

U.S. PATENT DOCUMENTS

2023/0316625 A1 *  10/2023  Yang ........................ G06F 3/017
                                                              345/473
2023/0368334 A1 *  11/2023  Kapelner ............. G06T 7/0002

FOREIGN PATENT DOCUMENTS

CN          111489287  A       8/2020
CN          115439305  B       11/2024

OTHER PUBLICATIONS

Written Opinion for International Application No. PCT/CN2022/095211, mailed Aug. 3, 2022, 07 Pages.
International Search Report in PCT/CN2022/095211, mailed Aug. 3, 2022, 4 pages.

* cited by examiner

Images presenting different image styles

400

500

GENERATING IMAGE METHOD AND APPARATUS, DEVICE, AND MEDIUM

CROSS-REFERENCE TO RELATED APPLICATION(S)

The disclosure is a U.S. National Stage Application of PCT Application Serial No. PCT/CN2022/095211, filed on May 26, 2022, which claims priority to Chinese patent application No. 202110608977.1, filed on Jun. 1, 2021 and entitled "Method and apparatus for generating image, device, and medium", the disclosures of which are incorporated in their entireties herein by reference.

FIELD

The disclosure relates to the technical field of image processing, and particularly relates to a method and apparatus for generating an image, a device, and a medium.

BACKGROUND

Nowadays, image style transfer has become a novel way of entertainment as functions of video interaction applications are gradually enriched. The image style transfer is to transfer one or more images to style images satisfying user requirements.

However, style transfer types supported by existing video interaction applications are still limited and far from satisfying personalized image style transfer requirements of users. Since an exhibition effect of the image style transfer is directly related to a model training effect, how to ensure a model training effect for personalized image style transfer is a problem to be solved currently.

SUMMARY

In order to solve the above technical problems or at least partially solve the above technical problems, examples of the disclosure provide a method and apparatus for generating an image, a device, and a medium.

In a first aspect, an example of the disclosure provides a method for generating an image. The method includes: obtaining an initial image of a target object, where the initial image is an image in a first image style; and inputting the initial image into a first machine learning model, and obtaining a target image of the target object based on an output result of the first machine learning model, where the target image is an image in a second image style; where the first machine learning model is obtained based on a second machine learning model, the second machine learning model is obtained training first sample images of the target object and second sample images of the target object, the first sample images are images obtained by rendering simulation models of the target object in different states based on rendering parameters in the first image style, and the second sample images images obtained by rendering simulation models of the target object in different states based on rendering parameters in the second image style; and the simulation models are configured to construct images of the target object in different states, and the different states include different shapes of the target object and/or different postures of the target object.

In a second aspect, an example of the disclosure further provides an apparatus for generating an image. The apparatus includes: an initial image obtainment module configured to obtain an initial image of a target object, where the initial image is an image in a first image style; and a target image determination module configured to input the initial image into a first machine learning model and obtain a target image of the target object based on an output result of the first machine learning model, where the target image is an image in a second image style; where the first machine learning model is obtained based on a second machine learning model, the second machine learning model is obtained through based on training first sample images of the target object and second sample images of the target object, the first sample images are images obtained by rendering simulation models of the target object in different states based on rendering parameters in the first image style, and the second sample images are images obtained by rendering simulation models of the target object in different states based on rendering parameters in the second image style; and the simulation models are configured to construct images of the target object in different states, and the different states include different shapes of the target object and/or different postures of the target object.

In a third aspect, an example of the disclosure further provides an electronic device. The electronic device includes a memory and a processor, where the memory stores a computer program which, when executed by the processor, causes the electronic device to perform the method for generating the image provided in examples of the disclosure.

In a fourth aspect, an example of the disclosure further provides a computer-readable storage medium. The storage medium stores a computer program which, when executed by a computing device, causes the computing device to perform any one of the methods for generating the image provided in examples of the disclosure.

Compared with the prior art, technical solutions provided in examples of the disclosure at least have advantages as follows:

In examples of the disclosure, the simulation models of the target object in different states are differently rendered based on different image style requirements, such that sample images presenting different image styles are obtained and taken as paired sample data for model training. Since each pair of sample images is obtained by rendering the same simulation model, the simulation model can accurately characterize features of the target object, image quality of the sample images is ensured, and further, high-quality sample data ensures a model training effect, and a relatively-desirable model training effect ensures a personalized image style transfer effect of the target object; and therefore, according to the examples of the disclosure, not only types of image style transfer are enriched, but also a model training effect and an exhibition effect of personalized image style transfer are ensured.

BRIEF DESCRIPTION OF THE DRAWINGS

The accompanying drawings herein are incorporated into the description as a constituent part of the description, illustrate examples conforming to the disclosure, and serve to explain principles of the disclosure along with the description.

In order to more clearly describe technical solutions in examples of the disclosure or in the prior art, accompanying drawings required to be used in descriptions in the examples or in the prior art will be briefly introduced below. Obviously, those of ordinary skill in the art would also derive other accompanying drawings according to these accompanying drawings without making inventive efforts.

DETAILED DESCRIPTION OF EMBODIMENTS

In order to more clearly understand the above objectives, features and advantages of the disclosure, solutions of the disclosure will be further described in detail below. It should be noted that examples of the disclosure and the features in the examples can be combined with each other without conflict.

Many specific details are set forth in the following description to facilitate full understanding of the disclosure, but the disclosure can also be implemented in other ways different from those described herein. Obviously, examples in the description are merely some examples rather than all examples of the disclosure.

Figure 1:
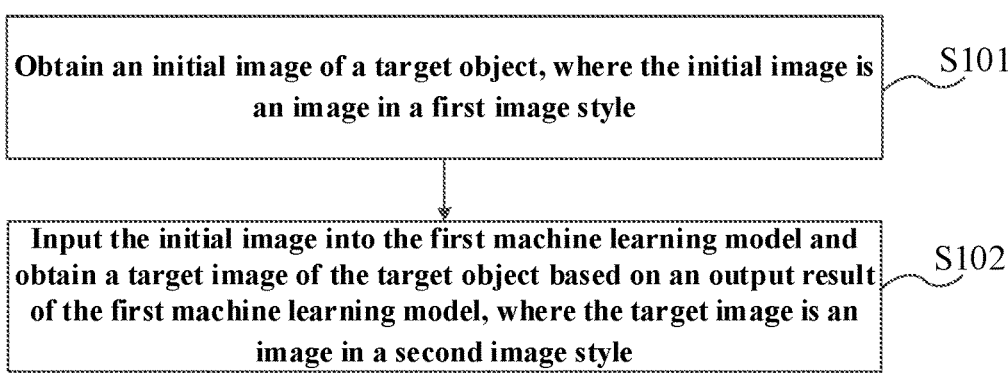
FIG. 1 is a flow diagram of a method for generating an image according to an example of the disclosure.

FIG. 1 is a flow diagram of a method for generating an image according to an example of the disclosure. The method may be executed by an apparatus for generating an image, and the apparatus may be implemented by software and/or hardware, and may be integrated on any electronic device having a computing capability, such as a mobile phone, a notebook and a tablet computer.

In addition, the apparatus for generating an image may be implemented in a form of an independent application or an applet integrated on a public platform, or may be implemented as a functional module integrated in an application or an applet having an image generation function. The application or the applet may include, but is not limited to, a video interaction application or a video interaction applet.

As shown in FIG. 1, the method for generating an image provided in an example of the disclosure may include the following:

S101: an initial image of a target object is obtained, where the initial image is an image in a first image style.

The target object may be any object having a style change requirement, such as a limb of a human body or an animal (specifically, the limb may include, but is not limited to, a hand or a foot, and a foot of a pet such as a cat or a dog may include a claw), or a component part of a physical entity. Exemplarily, the electronic device may obtain the initial image of the target object based on an image photographing operation or an image uploading operation of a user. In an instance with a hand as the target object, the electronic device may invoke a camera according to a photographing request triggered by a user, such that a hand image of the user is collected and taken as the initial image.

S102: the initial image is input into the first machine learning model and obtain a target image of the target object based on an output result of the first machine learning model, where the target image is an image in a second image style.

The first machine learning model is obtained based on a second machine learning model, the second machine learning model is obtained based on training first sample images (such as an image having a realistic effect, or referred to as the target object of a real shot image) of the target object and a second sample image (such as an image having any style and different from the image having a realistic effect) of the target object, the first sample images are images obtained by rendering simulation models of the target object in different states based on rendering parameters in the first image style, the second sample image are images obtained by rendering simulation models of the target object in different states based on rendering parameters in the second image style, the simulation models are configured to construct images of the target object in different states, and the different states include different shapes of the target object and/or different postures of the target object. The simulation model may be a pre-constructed model that can accurately characterize features of the target object, such as a two-dimensional (2D) model (or referred to as a two-dimensional modeling model) or a three-dimensional (3D model) (or referred to as a 3D mesh model or a three-dimensional modeling model). The simulation model may be obtained based on an open source simulation model library, or may be obtained by carrying out modeling by collecting data required for simulation model reconstruction. In order to ensure sufficiency and diversification of paired sample data for model training, sample images of the same target object in a plurality of states are required to be obtained to form a large amount of paired sample data. The different shapes of the target object may include a length, a width, a weight status of the target object, the weight status may include thinness, standard, fatness, etc., and specific division may be determined according to differences between the simulation models.

In an instance with a hand of a person as the target object, hand gestures may include various gestures formed by the hand, such as a straightened hand, a bent finger and an ok gesture; and hand shapes include a weight status of the hand, such that a thin hand (for example, a thickness of a palm is less than a thickness threshold, and the thickness threshold may be flexibly selected), a standard hand (for example, the thickness of the palm is equal to the thickness threshold), a fat hand (for example, the thickness of the palm is greater than the thickness threshold), etc. It should be understood that the weight status of the hand may also be measured according to other available hand features, for example, the weight status may be differentiated according to a diameter of a particular finger, etc.

In an optional embodiment, the simulation models of the target object in different states may be obtained by adjusting a state parameter (including shape parameters and posture parameters) of an initial simulation model of the target object. The initial simulation models may be obtained based on an open source model library, or may be obtained through self-modeling. In an instance with a limb as the target object, the initial simulation model may be a model of the limb in a specific standard state. After opening the initial simulation model by means of a modeling tool, a user may set state parameters, and the electronic device adjusts the state parameters of the initial simulation model according to a parameter setting operation of the user, such that a plurality of simulation models of the limb in different states are obtained. The state parameters may be set according to parameter layout in the modeling tool.

Figure 2:
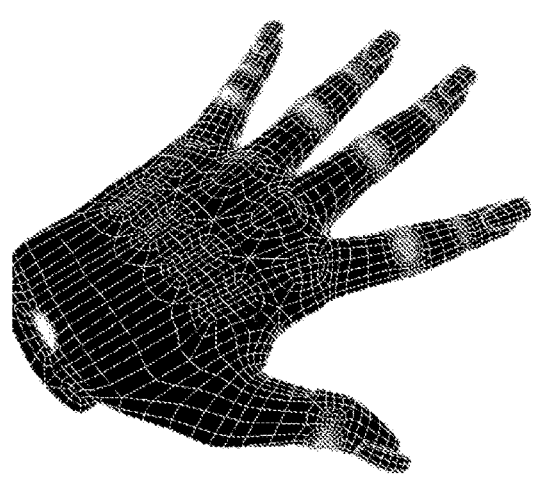
FIG. 2 is a schematic diagram of a three-dimensional (3D) model of a hand according to an example of the disclosure.

FIG. 2 shows a schematic diagram of a 3D model of a hand in an instance with a hand as the target object. The 3D model may be configured to exemplarily describe an initial simulation model or simulation model in an example of the disclosure, but should not be construed as a specific limitation on the example of the disclosure.

In an example of the disclosure, the first machine learning model has a function of generating an image in a second image style. The first machine learning model and the second machine learning model may be machine learning models having the same model structure. In this case, the first machine learning model is obtained based on the second machine learning model, and it may be considered that a model output effect of the first machine learning model is better than a model output effect of the second machine learning model, or it may be considered that the first machine learning model is the second machine learning model. The first machine learning model and the second machine learning model may be machine learning models having different model structures. For example, the first machine learning model is obtained based on training third sample images of the target object and fourth sample images of the target object, the third sample images are images in the first image style, and the fourth sample images are images obtained by inputting the third sample image to the second machine learning model and output by the second machine learning model.

Exemplarily, the second machine learning model may be obtained by training generative adversarial networks (GANs) based on a first sample image of the target object and a second sample image of the target object, and the first machine learning model may be obtained by training conditional generative adversarial networks (CGANs) based on third sample images of the target object and fourth sample images corresponding to the third sample images and output by the second machine learning model. It should be noted that the third sample image and the first sample image have the same image style. In a model training process, the third sample image and the first sample image may be the same image or different images, which is not specifically limited in an example of the disclosure. In addition, any other applicable neural networks may be used in the model training process, and the networks are not limited to the above generative adversarial networks and conditional generative adversarial networks.

In a model training process of a two-step method, based on ensuring generation quality of a style image, a space occupation quantity and computational complexity of the first machine learning model may be less than model features corresponding to the second machine learning model, such that the first machine learning model may be transmitted to a user terminal for operation, and the user terminals having different performances can be taken into account. In addition, in an instance with an image having a realistic effect as the first sample image, since the first sample image and the second sample image of the target object are both obtained by rendering the simulation models of the target object, there are certain differences between the first sample image and the second sample image and images of the target object in real scenes. The fourth sample image corresponding to the third sample image (having the same style as the first sample image) is generated by means of the second machine learning model, and then the third sample image and the fourth sample image are used to train the first machine learning model, such that the first machine learning model has a capability to accurately process a real shot image of the target object, which is conducive to improvement in a model training effect, and further conducive to improvement in a style transfer effect for the real shot image.

In an example of the disclosure, the style image corresponding to the initial image of the target object is obtained by means of the pre-trained first machine learning model, such that types of image style transfer are enriched, an exhibition effect of personalized image style transfer is ensured, and user experience is improved.

In an example of the disclosure, considering that more sample data is required to be used in a model training process, paired sample data may be constructed by means of a simulation model having a target object feature characterization capability in the example of the disclosure. On the one hand, by virtue of flexible adjustability of the simulation models and flexible settings of the rendering parameter, efficiency of generating diversified paired sample data can be improved, and the problems that due to limitation of the number of images in the first image style of the target object and the second image style, sample data for model training is insufficient, and especially when the first image style corresponds to an image style having a realistic effect, the amount of sample data is extremely limited can be solved. On the other hand, if the simulation model is dynamically reconstructed (for example, 3D model reconstruction is carried out) based on the plurality of the sample images (such as sample images of styles having a realistic effect) in the first image style of the target object, and a sample image of the required second image style is generated based on the currently reconstructed simulation model, since an implementation process of model reconstruction is complex and more errors are likely to be introduced in a reconstruction process, the simulation model repeatedly constructed based on the plurality of sample images in the first image style of the target object has a large deviation on feature representation of the target object, and further the sample image in the second image style generated based on the dynamically constructed simulation model has a large feature deviation from the sample image in the first image style of the target object. That is, quality of paired sample data formed by the sample image in the first image style of the target object and the sample image in the second image style generated based on model reconstruction is poor (or data accuracy is low), and a model training effect is affected. In an example of the disclosure, all predetermined simulation models of the target object are rendered based on rendering parameters of different image styles respectively, and a feature deviation between the obtained first sample image and second sample image is small such that quality of paired sample data for model training can be ensured, and a training effect of an image generation model is ensured.

In an optional embodiment, in a process of constructing a sample image, the rendering parameter of each different image style mentioned in an example of the disclosure includes at least one of a texture parameter, a color parameter, an illumination parameter and a special effect parameter of the target object. At least one type of the rendering parameters in the first image style and the second image style are different, that is, two images corresponding to different image styles may be obtained by rendering the same simulation model. For example, the texture features of the target object, the colors (such as skin colors), the illumination features, or the presented special effects (such as specific props exhibited on the images) presented on the first sample image and the second sample image are different, the presented, etc. The rendering parameters of different image styles may be determined according to model training requirements or sample data construction requirements.

Alternatively, the rendering parameter further includes a background parameter, and the background parameter and the illumination parameter are randomly adjusted in a rendering process, such that a realistic effect of the images obtained through rendering is increased. Moreover, the more number of times of random adjustment, the more types of images obtained through rendering, which is conducive to increase in diversity of sample data and ensures a model training effect.

In an example of the disclosure, each simulation models is rendered according to rendering parameters of two image styles, and every two images of the target object obtained may be taken as a group of paired sample data. In an instance in which the first image style corresponds to an image style having a realistic effect and the second image style corresponds to a specific style of a certain effect image, a plurality of first sample images having a realistic effect may be obtained by rendering all simulation models based on a plurality of groups of rendering parameters in the first image style, and a plurality of second sample images of a specific effect style may be obtained by rendering all simulation models based on a plurality of groups of rendering parameters in the second image style. For example, at least one of a texture, a color, illumination and a special effect of the second sample image is different from that of the first sample image. Specifically, the rendering parameters in the second image style may be determined according to model training requirements or sample data construction requirements, and every two sample images (including one image having a realistic effect and one image in a specific effect style) obtained by rendering the same simulation model are taken as a group of paired sample data for a model training process. It should be understood that the foregoing instances in the first image style and the second image style are also valid on the contrary, that is, the second image style may correspond to an image style having a realistic effect, and the first image style may correspond to a specific style of a certain effect image.

Figure 3:
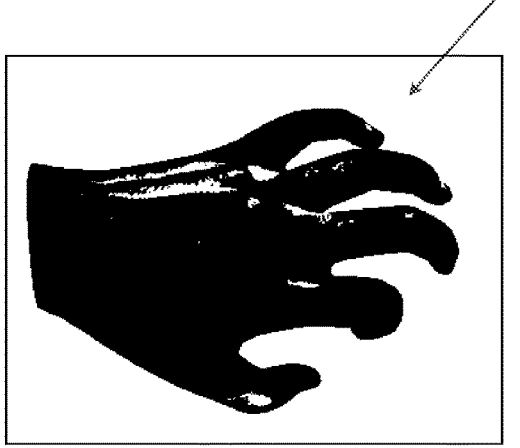
FIG. 3 is a schematic diagram showing hand images presenting different image styles according to an example of the disclosure.
Figure 3:
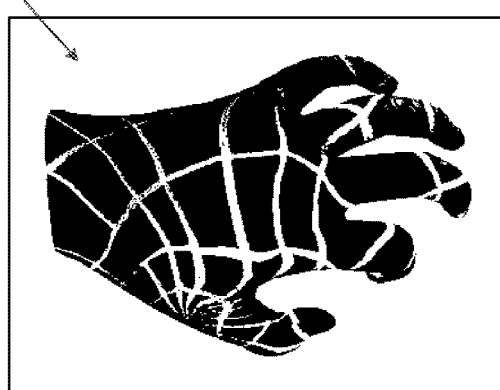

FIG. 3 is a schematic diagram showing hand images presenting different image styles according to an example of the disclosure, which may be used to exemplarily describe a first sample image and a second sample image of a target object in the example of the disclosure, but should not be construed as a specific limitation on the example of the disclosure. As shown in FIG. 3, a left image in FIG. 3 may be taken as an instance of a first sample image having a realistic effect, and a right image in FIG. 3 may be taken as an instance of a second sample image having a specific effect style. For example, a hand on the second sample image has a specific texture feature. The two hand images in FIG. 3 may be taken as a group of paired sample data for a model training process.

It is assumed that N simulation models in different states may be obtained by adjusting state parameters of an initial simulation model having a capability to characterize features of the target object, and then all simulation models are rendered according to the rendering parameters (it is assumed that there are M groups of rendering parameters of each image style) of different image styles such that N×M pairs of paired sample data may be obtained. That is, a large number of sample data having differences in state, texture, color, illumination, special effect, etc. of the target object can be conveniently constructed based on the technical solution of the example of the disclosure such that the model obtained through training can process any input image and output a corresponding image having a specific effect.

In examples of the disclosure, the simulation models of the target object in different states are differently rendered based on different image style requirements, such that sample images presenting different image styles are obtained and taken as paired sample data for training an image generation model. Since each pair of sample images is obtained by rendering the same simulation model, the simulation model can accurately characterize features of the target object, image quality of the first sample image and the second sample image is ensured, and further, high-quality sample data ensures a model training effect, and a relatively-desirable model training effect ensures a personalized image style transfer effect of the target object. Therefore, according to the examples of the disclosure, not only types of image style transfer are enriched, but also a model training effect and an exhibition effect of personalized image style transfer are ensured.

Figure 4:
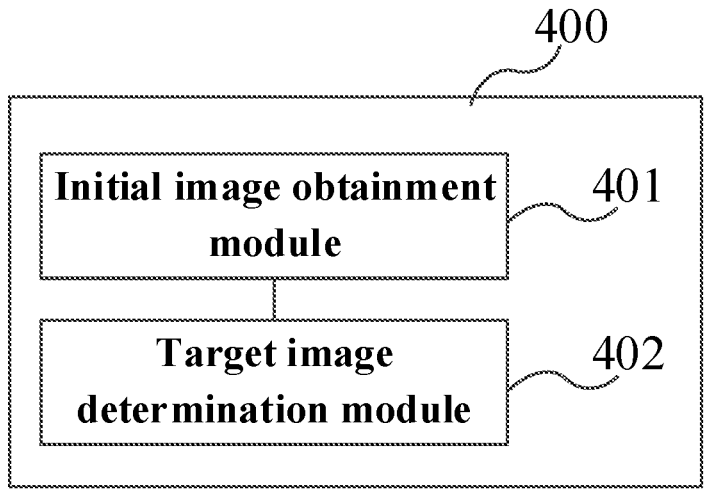
FIG. 4 is a schematic structural diagram of an apparatus for generating an image according to an example of the disclosure.

FIG. 4 is a schematic structural diagram of an apparatus for generating an image according to an example of the disclosure. The apparatus may be implemented by software and/or hardware, and may be integrated on any electronic device having a computing capability, such as a terminal or a server.

As shown in FIG. 4, the apparatus 400 for generating an image provided in the example of the disclosure may include an initial image obtainment module 401 and a target image determination module 402, where the initial image obtainment module 401 is configured to obtain an initial image of a target object, where the initial image is an image in a first image style; and the target image determination module 402 is configured to input the initial image into the first machine learning model and obtain a target image of the target object based on an output result of the first machine learning model, where the target image is an image in a second image style; where the first machine learning model is obtained based on a second machine learning model, the second machine learning model is obtained based on training first sample images of the target object and second sample images of the target object, the first sample images are images obtained by rendering simulation models of the target object in different states based on rendering parameters in the first image style, the second sample images are images obtained by rendering simulation models of the target object in different states based on rendering parameters in the second image style, the simulation models are configured to construct images of the target object in different states, and the different states include different shapes of the target object and/or different postures of the target object.

Alternatively, the first machine learning model is the second machine learning model.

Alternatively, the first machine learning model is obtained based on training third sample images of the target object and fourth sample images of the target object, the third sample images are images in the first image style, and the fourth sample images are images output by the second machine learning model by inputting the third sample images into the second machine learning model.

Alternatively, the simulation models of the target object in different states are obtained by adjusting a state parameter of an initial simulation model of the target object.

Alternatively, the rendering parameters include at least one of a texture parameter, a color parameter, an illumination parameter and a special effect parameter of the target object, and at least one type of the rendering parameters in the first image style and the second image style are different.

Alternatively, the rendering parameter further includes a background parameter, and the background parameter and the illumination parameter are randomly adjusted in a rendering process.

Alternatively, the target object includes a hand or a foot.

Figure 5:
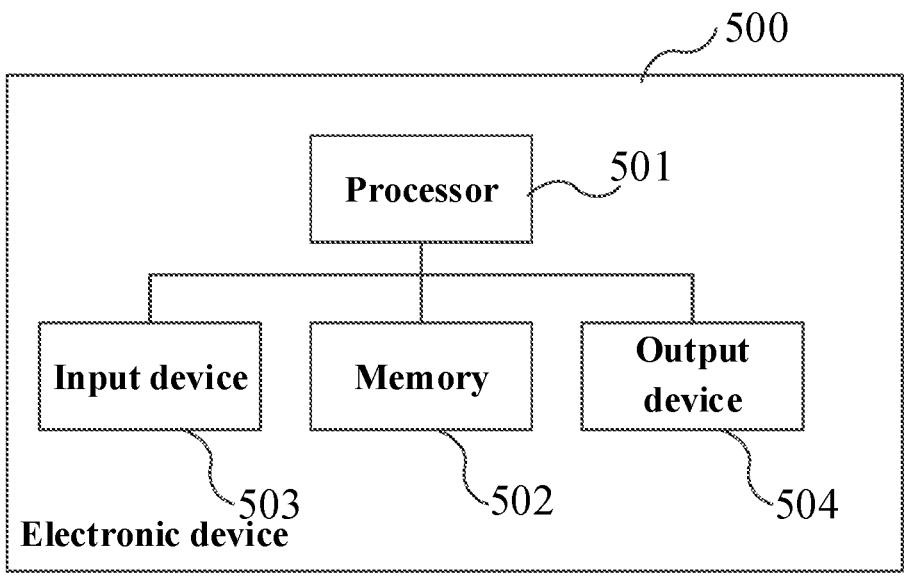
FIG. 5 is a schematic structural diagram of an electronic device according to an example of the disclosure.

The apparatus for generating an image provided in the example of the disclosure may execute any method for generating an image provided in the example of the disclosure, and has corresponding functional modules and beneficial effects for executing the method. Reference can be made to the description in any method example of the disclosure for the content not described in detail in the apparatus example of the disclosure. FIG. 5 is a schematic structural diagram of an electronic device according to an example of the disclosure, which is used to exemplarily describe an electronic device for the method for generating an image according to an example of the disclosure. The electronic device in an example of the disclosure can include, but is not limited to, a mobile terminal such as a mobile phone, a notebook computer, a digital broadcast receiver, a personal digital assistant (PDA), a PAD, a portable multimedia player (PMP), and an in-vehicle terminal (such as an in-vehicle navigation terminal), and a stationary terminal such as a digital television (TV), a desktop computer, a smart home device, a wearable electronic device, and a server. The electronic device shown in FIG. 5 is merely an instance, and should not bring any limitation on functions and occupation scopes of the examples of the disclosure.

As shown in FIG. 5, the electronic device 500 includes one or more processors 501 and a memory 502.

The processor 501 may be a central processing unit (CPU) or processing units in other forms having data processing capabilities and/or instruction execution capabilities, and may control other assemblies of the electronic device 500 to execute desired functions.

The memory 502 may include one or more computer program products, which may include computer-readable storage media in various forms, such as a volatile memory and/or a non-volatile memory. The volatile memory may include, for example, a random access memory (RAM) and/or a cache. The non-volatile memory may include, for example, a read only memory (ROM), a hard disk and a flash memory. The computer-readable storage medium may store one or more computer program instructions, and the processor 501 may execute the program instructions to implement the method for generating an image provided in an example of the disclosure, and may also implement other desired functions. The computer-readable storage medium may further store various contents such as an input signal, a signal component and a noise component.

The method for generating an image provided in an example of the disclosure includes: obtain an initial image of a target object, where the initial image is an image in a first image style; and input the initial image into the first machine learning model and obtain a target image of the target object based on an output result of the first machine learning model, where the target image is an image in a second image style; where the first machine learning model is obtained based on a second machine learning model, the second machine learning model is obtained based on training first sample images of the target object and second sample images of the target object, the first sample images are images obtained by rendering simulation models of the target object in different states based on rendering parameters in the first image style, the second sample images are images obtained by rendering simulation models of the target object in different states based on rendering parameters in the second image style, the simulation models are configured to construct images of the target object in different states, and the different states include different shapes of the target object and/or different postures of the target object.

It should be understood that the electronic device 500 may further execute other optional implementation solutions provided in the method examples of the disclosure.

In an instance, the electronic device 500 may further include: an input device 503 and an output device 504, and these assemblies are interconnected by a bus system and/or connecting mechanisms (not shown) in other forms.

In addition, the input device 503 may further include, for example, a keyboard and a mouse.

The output device 504 may output various types of information to the outside, which include determined distance information, direction information, etc. The output device 504 may include, for example, a display, a speaker, a printer, a communication network and a remote output device connected thereto, etc.

Certainly, only some of the assemblies of the electronic device 500 related to the disclosure are illustrated in FIG. 5 for simplicity, and assemblies such as a bus and an input/output interface are omitted. In addition, the electronic device 500 may further include any other appropriate assemblies according to specific application situations.

In addition to the above method and device, an example of the disclosure further provides a computer program product. The computer program product includes a computer program or computer program instruction, where when executed by the computing device, the computer program or computer program instruction causes the computing device to implement any method for generating an image provided in the examples of the disclosure.

The computer program product may write program codes for executing operations of examples of the disclosure with any combination of one or more programming languages, programming languages include object oriented programming languages such as Java and C++, and conventional procedural programming languages, such as a "C" language or similar programming languages. The program codes may be executed entirely on the user electronic device, partly on the user electronic device, as a stand-alone software package, partly on the user electronic device and partly on a remote electronic device or entirely on the remote electronic device.

In addition, an example of the disclosure may further provide a computer-readable storage medium. The storage medium stores a computer program instruction, where when executed by the computing device, the computer program instruction causes the computing device to implement any method for generating an image provided in the examples of the disclosure.

The method for generating an image provided in an example of the disclosure includes: obtain an initial image of a target object, where the initial image is an image in a first image style; and input the initial image into the first machine learning model and obtain a target image of the target object based on an output result of the first machine learning model, where the target image is an image in a second image style; where the first machine learning model is obtained based on a second machine learning model, the second machine learning model is obtained through training based on first sample images of the target object and second sample images of the target object, the first sample images are an image obtained by rendering simulation models of the target object in different states based on rendering parameters in the first image style, the second sample image are images obtained by rendering simulation models of the target object in different states based on rendering parameters in the second image style, the simulation models are configured to construct images of the target object in different states, and the different states include different shapes of the target object and/or different postures of the target object.

It should be understood that when executed by the computing device, the computer program instruction may cause the computing device to implement other optional implementation solutions provided in the method examples of the disclosure.

The computer-readable storage medium may employ any combination of one or more readable media. The readable medium may be a readable signal medium or a readable storage medium. The readable storage medium may include, but is not limited to, electronic, magnetic, optical, electromagnetic, infrared or semiconductor systems, apparatuses or devices, or any combination of the foregoing. More specific instances (a non-exhaustive list) of the readable storage medium include: an electrical connector having one or more wires, a portable computer disk, a hard disk, a random access memory (RAM), an ROM, an erasable programmable read-only memory (EPROM or a flash memory), an optical fiber, a compact disc read-only memory (CD-ROM), an optical storage device, a magnetic storage device or any suitable combination of the foregoing.

It should be noted that relational terms such as "first" and "second" herein are merely used to distinguish one entity or operation from another entity or operation without certainly requiring or implying any such actual relation or order between such entities or operations. In addition, terms "include", "comprise" or their any other variations are intended to cover non-exclusive inclusions, such that a process, a method, an article or an device including a series of elements not only includes those elements, but also includes other elements that are not explicitly listed, or also includes inherent elements of such process, method, article or device. Under the circumstance of no more limitations, an element limited by phrases "comprising a . . . " and "including a . . . " does not exclude other same elements in a process, method, article or device including the element.

The above embodiments are merely particular embodiments of the disclosure such that those skilled in the art can understand or implement the disclosure. Various modifications to these examples are readily apparent to those skilled in the art, and the general principles defined herein can be implemented in other examples without departing from the spirit or scope of the disclosure. Therefore, the disclosure is not limited to these examples shown herein but falls within the widest scope consistent with the principles and novel features disclosed herein.

We claim:

1. A method for generating an image, comprising:
obtaining an initial image of a target object, wherein the initial image is an image in a first image style; and
inputting the initial image into a first machine learning model, and obtaining a target image of the target object based on an output result of the first machine learning model, wherein the target image is an image in a second image style; wherein
the first machine learning model is obtained based on a second machine learning model, the second machine learning model is obtained based on training first sample images of the target object and second sample images of the target object, the first sample images are images obtained by rendering simulation models of the target object in different states based on rendering parameters in the first image style, and the second sample images are images obtained by rendering simulation models of the target object in different states based on rendering parameters in the second image style; and the simulation models are configured to construct images of the target object in different states, and the different states comprise at least one of: different shapes of the target object, or different postures of the target object.

2. The method according to claim 1, wherein the first machine learning model is the second machine learning model.

3. The method according to claim 1, wherein the first machine learning model is obtained by training third sample images of the target object and fourth sample images of the target object, the third sample images are images in the first image style, and the fourth sample images are images output by the second machine learning model by inputting the third sample images into the second machine learning model.

4. The method according to claim 1, wherein the simulation models of the target object in different states are obtained by adjusting a state parameter of an initial simulation model of the target object.

5. The method according to claim 1, wherein the rendering parameters comprises at least one of a texture parameter, a color parameter, an illumination parameter and a special effect parameter of the target object, and
at least one parameter of the rendering parameters in the first image style and the second image style are different.

6. The method according to claim 5, wherein the rendering parameters further comprises a background parameter, and the background parameter and the illumination parameter are randomly adjusted in a rendering process.

7. The method according to claim 1, wherein the target object comprises a hand or a foot.

8. An electronic device, comprising a memory and a processor, wherein the memory stores a computer program which, when executed by the processor, causes the electronic device to:
obtain an initial image of a target object, wherein the initial image is an image in a first image style; and
input the initial image into a first machine learning model, and obtain a target image of the target object based on an output result of the first machine learning model, wherein the target image is an image in a second image style; wherein
the first machine learning model is obtained based on a second machine learning model, the second machine learning model is obtained based on training first sample images of the target object and second sample images of the target object, the first sample images are images obtained by rendering simulation models of the target object in different states based on rendering parameters in the first image style, and the second sample images are images obtained by rendering simulation models of the target object in different states based on rendering parameters in the second image style; and
the simulation models are configured to construct images of the target object in different states, and the different states comprise at least one of: different shapes of the target object, or different postures of the target object.

9. The electronic device according to claim 8, wherein the first machine learning model is the second machine learning model.

10. The electronic device according to claim 8, wherein the first machine learning model is obtained by training third sample images of the target object and fourth sample images of the target object, the third sample images are images in the first image style, and the fourth sample images are images output by the second machine learning model by inputting the third sample images into the second machine learning model.

11. The electronic device according to claim 8, wherein the simulation models of the target object in different states are obtained by adjusting a state parameter of an initial simulation model of the target object.

12. The electronic device according to claim 8, wherein the rendering parameters comprises at least one of a texture parameter, a color parameter, an illumination parameter and a special effect parameter of the target object, and at least one parameter of the rendering parameters in the first image style and the second image style are different.

13. The electronic device according to claim 12, wherein the rendering parameters further comprises a background parameter, and the background parameter and the illumination parameter are randomly adjusted in a rendering process.

14. The electronic device according to claim 8, wherein the target object comprises a hand or a foot.

15. A non-transitory computer-readable storage medium storing a computer program which, when executed by a computing device, causes the computing device to perform:

obtaining an initial image of a target object, wherein the initial image is an image in a first image style; and inputting the initial image into a first machine learning model, and obtaining a target image of the target object based on an output result of the first machine learning model, wherein the target image is an image in a second image style; wherein the first machine learning model is obtained based on a second machine learning model, the second machine learning model is obtained based on training first sample images of the target object and second sample images of the target object, the first sample images are images obtained by rendering simulation models of the target object in different states based on rendering parameters in the first image style, and the second sample images are images obtained by rendering simulation models of the target object in different states based on rendering parameters in the second image style; and the simulation models are configured to construct images of the target object in different states, and the different states comprise at least one of: different shapes of the target object, or different postures of the target object.

16. The non-transitory computer-readable storage medium according to claim 15, wherein the first machine learning model is the second machine learning model.

17. The non-transitory computer-readable storage medium according to claim 15, wherein the first machine learning model is obtained by training third sample images of the target object and fourth sample images of the target object, the third sample images are images in the first image style, and the fourth sample images are images output by the second machine learning model by inputting the third sample images into the second machine learning model.

18. The non-transitory computer-readable storage medium according to claim 15, wherein the simulation models of the target object in different states are obtained by adjusting a state parameter of an initial simulation model of the target object.

19. The non-transitory computer-readable storage medium according to claim 15, wherein the rendering parameters comprises at least one of a texture parameter, a color parameter, an illumination parameter and a special effect parameter of the target object, and at least one parameter of the rendering parameters in the first image style and the second image style are different.

20. The non-transitory computer-readable storage medium according to claim 19, wherein the rendering parameters further comprises a background parameter, and the background parameter and the illumination parameter are randomly adjusted in a rendering process.

* * * * *